(12) United States Patent
Shao et al.

(10) Patent No.: US 7,908,234 B2
(45) Date of Patent: Mar. 15, 2011

(54) SYSTEMS AND METHODS OF PREDICTING RESOURCE USEFULNESS USING UNIVERSAL RESOURCE LOCATORS INCLUDING COUNTING THE NUMBER OF TIMES URL FEATURES OCCUR IN TRAINING DATA

(75) Inventors: Zheng Shao, Sunnyvale, CA (US); Wenjie Fu, Pittsburgh, PA (US)

(73) Assignee: Yahoo! Inc., Sunnyvale, CA (US)

( * ) Notice: Subject to any disclaimer, the term of this patent is extended or adjusted under 35 U.S.C. 154(b) by 629 days.

(21) Appl. No.: 12/032,111

(22) Filed: Feb. 15, 2008

(65) Prior Publication Data

US 2009/0210369 A1    Aug. 20, 2009

(51) Int. Cl.
*G06E 1/00* (2006.01)
(52) U.S. Cl. .......................... 706/21; 707/723
(58) Field of Classification Search .............. 706/20–21, 706/45–48; 707/723, 706, 728, 730, 748
See application file for complete search history.

(56) References Cited

U.S. PATENT DOCUMENTS

2006/0218143 A1   9/2006  Najork
2008/0195631 A1*  8/2008  Dom et al. ................ 707/10

OTHER PUBLICATIONS

Gunduz et al., A Web Page Prediction Model Based on Click-Stream Tree Representation of User Behavior, 2003, ACM, pp. 535-540.*
Sun et al., Web Classification Using Support Vector Machine, 2002 ACM, pp. 96-99.*
Brown-Syed et. al, Using Newsgroup Headers to Predict Document Relevance, 1999, Information Research, pp. 1-18.*
Page, The PageRank Citation Rankig: Bringing Order to the Web, 1998, Stanford Info lab, pp. 1-17.*
Shi et al., A PPM Prediction Model Based on Web Objects Popularlity, 2005, Springer-Verlag, pp. 1-10.*
Ziv Bar-Yossef et al., "Do Not Crawl in the Dust: Different URLs with Similar Text", *WWW 2007/ Track: Data Mining*, May 8-12, 2007, (pp. 111-120).
Min-Yen Kan, "Web Page Categorization without the Web Page", *WWW 2004*, May 17-22, 2004, (pp. 262-263).
"Naive Bayes classifier", *Wikipedia*—wikipedia.org, Jan. 11, 2008 (pp. 1-7).
"Logistic regression", *Wikipedia*—wikipedia.org, Feb. 12, 2008 (pp. 1-5).

* cited by examiner

*Primary Examiner* — David R Vincent
(74) *Attorney, Agent, or Firm* — James J. DeCarlo; Greenberg Traurig, LLP

(57) ABSTRACT

A method, system and apparatus are provided to train a usefulness prediction model to generate a usefulness prediction in connection with a given universal resource locator (URL), the training of the usefulness prediction model being based on a training set of URLs and a count of negative URLs and a count of positive URLs identified by the training set, and for each feature extacted from the URLs in the training set, a count of the positive URLs in the training set that include the feature and a count of the negative URLs in the training set that include the feature. One or more features of the given URL are extracted, and the extracted features are used together with the usefulness prediction model to generate a usefulness prediction for the given URL.

34 Claims, 12 Drawing Sheets

Figure 1:
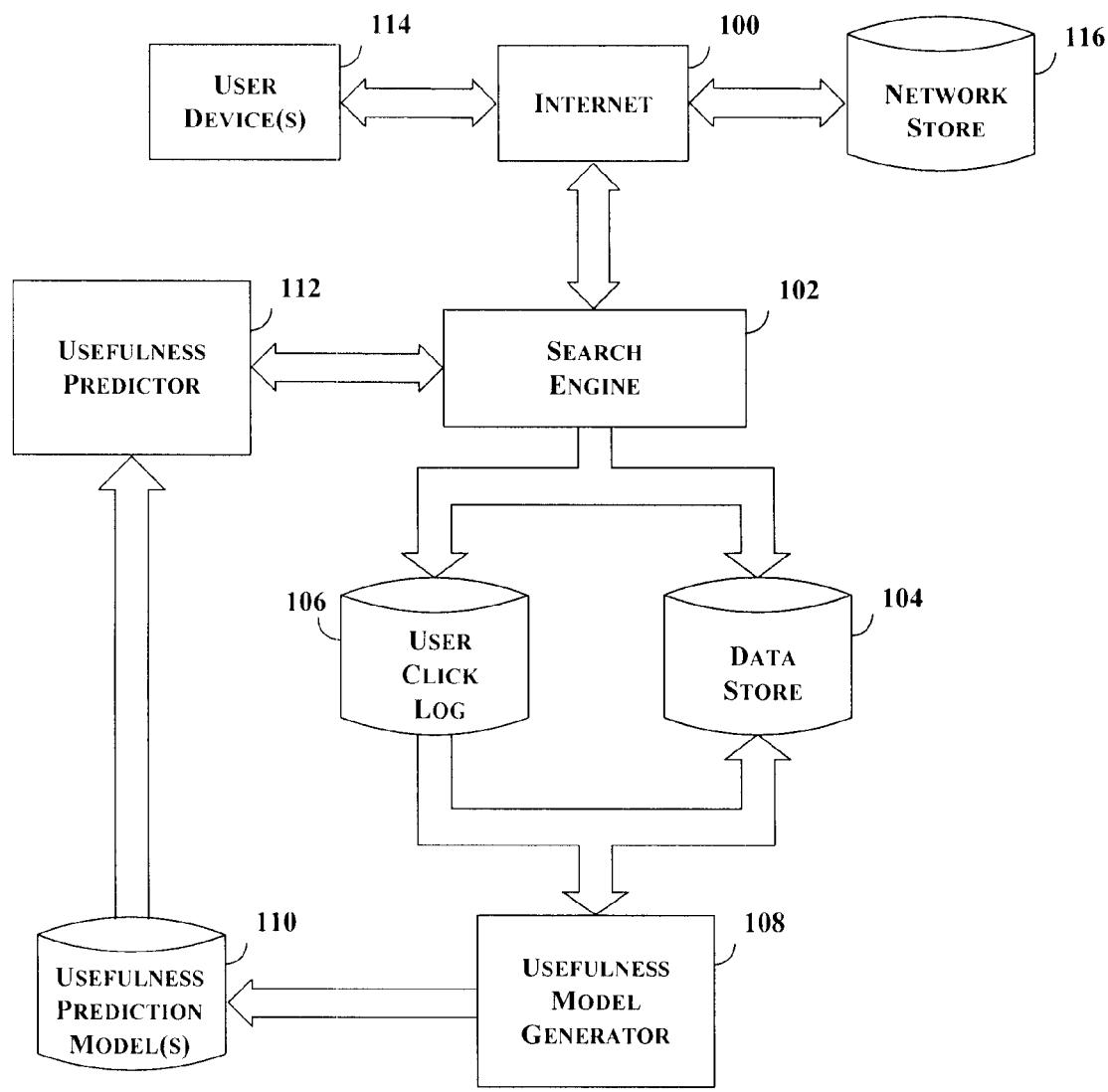

| CLASSES: | POS, NEG | |
|---|---|---|
| NO. OF URLS IN TRAINING SET: | 1000 | |
| NO. OF POSITIVE URLS: | 100 | $P(\text{Pos}) = 100/1000 = 0.1$ — 700A |
| NO. OF NEGATIVE URLS: | 900 | $P(\text{Neg}) = 900/1000 = 0.9$ — 700B |

FEATURES

| FEATURE: | news | |
|---|---|---|
| NO. OF POSITIVE URLS: | 5 | $P(\text{"news"}|\text{Pos}) = 5/100 = 0.05$ — 702A |
| NO. OF NEGATIVE URLS: | 1 | $P(\text{"news"}|\text{Neg}) = 1/900 = 0.0011$ — 702B |

| FEATURE: | html | |
|---|---|---|
| NO. OF POSITIVE URLS: | 30 | $P(\text{"html"}|\text{Pos}) = 30/100 = 0.3$ — 704A |
| NO. OF NEGATIVE URLS: | 15 | $P(\text{"html"}|\text{Neg}) = 15/900 = 0.0167$ — 704B |

FIGURE 7

$P(\text{Pos}| F1, F2, ...) = P(\text{Pos}, F1, F2, ...) /$
$\quad\quad (P(\text{Pos}, F1, F2, ...) + P(\text{Neg}, F1, F2, ...))$ } 802A $P(\text{Neg}| F1, F2, ...) = P(\text{Neg}, F1, F2, ...) /$
$\quad\quad (P(\text{Pos}, F1, F2, ...) + P(\text{Neg}, F1, F2, ...))$ } 802B WHERE:
  Fi ARE FEATURES;

$P(\text{Pos}, F1, F2, ...) = P(\text{Pos}) * P(F1|\text{Pos}) * P(F2|\text{Pos}) * ... ;$ } 804A $P(\text{Neg}, F1, F2, ...) = P(\text{Neg}) * P(F1|\text{Neg}) * P(F2|\text{Neg}) * ...$ } 804B

FIGURE 8A http://www.yahoo.com/news/2.html } 810

FEATURES: "news" AND "html" } 812

$P(\text{Pos}| \text{"news"}, \text{"html"}) = P(\text{Pos}, \text{"news"}, \text{"html"}) /$
$\quad\quad (P(\text{Pos}, \text{"news"}, \text{"html"}) + P(\text{Neg}, \text{"news"}, \text{"html"}))$ } 814A $P(\text{Neg}| \text{"news"}, \text{"html"}) = P(\text{Neg}, \text{"news"}, \text{"html"}) /$
$\quad\quad (P(\text{Pos}, \text{"news"}, \text{"html"}) + P(\text{Neg}, \text{"news"}, \text{"html"}))$ } 814B $P(\text{Pos}, \text{"news"}, \text{"html"}) = 0.1 * 0.05 * 0.3 = 0.0015$ } 816A $P(\text{Neg}, \text{"news"}, \text{"html"}) = 0.9 * 0.0011 * 0.0167 = 0.0000165$ } 816B $P(\text{Pos}| \text{"news"}, \text{"html"}) = 0.0015 / (0.0015 + 0.0000165) = 98.91\%$ } 818A $P(\text{Neg}| \text{"news"}, \text{"html"}) = 0.0000165 / (0.0015 + 0.0000165) = 1.09\%$ } 818B

FIGURE 8B $P(\text{Pos}| F1, F2, ...) = 1 / 1+e^{-(B0 + B1*F1 + B2*F2 + ...)}$ ⎫ 902A $P(\text{Neg}| F1, F2, ...) = 1 - \left[ 1 / 1+e^{-(B0 + B1*F1 + B2*F2 + ...)} \right]$ ⎫ 902B WHERE:
  Fi ARE FEATURES;
  Bi ARE WEIGHTINGS; AND
  B0 + B1*F1 + B2*F2 + ... = FEATURE VECTOR • WEIGHT VECTOR

FIGURE 9A

|   | 0 | 1 | 2 | 3 | ... | 904A |
|---|---|---|---|---|---|---|
|   |   | html | php | news | ... | 904B |
| F | 1 | 1 | 0 | 0 | ... | 904C |
| B | 0.1 | 0.3 | -0.1 | 0.05 | ... | 904D |

906

B0  +  B1*F1  +  B2*F2  +  B3*F3  +  ...

1*0.1  +  1*0.3  +  0*-0.1  +  0*0.05  +  ...

0.1  +  0.3  +  0  +  0  +  ...  =  0.4

$P(\text{Pos}| F1, F2, ...) = 1 / 1+e^{-0.4} = 59.87\%$ ⎫ 908A $P(\text{Neg}| F1, F2, ...) = 1 - 0.5987 = 40.13\%$ ⎫ 908B

FIGURE 9B

A: No. of Positive URLs in the Training Data That Include the Feature;
B. No. or Positive URLs in the Training Data That Do Not Include the Feature;
C: No. of Negative URLs in the Training Data That Include the Feature; and
D: No. of Negative URLs in the Training Data That Do Not Include the Feature.

Info. Gain = New Info. − Old Info.

New Info. = Prob. w/ Feature*Info. w/ Feature + Prob. w/o Feature*Info. w/o Feature Prob. w/ Feature = (A+C)/(A+B+C+D)

Prob. w/o Feature = (B+D)/(A+B+C+D)

Info w/ Feature = -((A/(A+C))*log(A/(A+C))) − ((C/(A+C))*log(C/(A+C)))

Info w/o Feature = -((B/(B+D))*log(B/(B+D))) − ((D/(B+D))*log(D/(B+D)))

Old Info. = -P(Pos)*log(P(Pos)) - P(Neg)*Log(P(Neg))

P(Pos) = (A+B)/(A+B+C+D)

P(Neg) = (C+D)/(A+B+C+D)

FIGURE 11

SYSTEMS AND METHODS OF PREDICTING RESOURCE USEFULNESS USING UNIVERSAL RESOURCE LOCATORS INCLUDING COUNTING THE NUMBER OF TIMES URL FEATURES OCCUR IN TRAINING DATA

FIELD OF THE INVENTION

The present disclosure relates to identifying usefulness of web resources, and in particular for examining a web resource's resource locator to predict a usefulness of the web resource.

BACKGROUND

Documents are stored in electronic form in storage repositories, which can be physically located at many different geographic locations. Each document has a label, or name intended to uniquely identify the document.

With the Internet, and/or other computer networks, computer users are able to access the documents via one or more network servers. Tools, such as search engines, are available to the user to search for and retrieve these documents. A search engine typically uses a utility referred to as a crawler, to locate stored documents. Results of one or more "crawls" can then be used to generate an index of documents, which can be searched to identify documents that satisfy a user's search criteria. In a case of the web, a resource, which includes a file containing a document, has a universal resource locator, or URL. Each URL conforms to a known format, or syntax, and is intended to uniquely identify the file.

A crawler typically searches web sites to locate resources, and returns a listing of resources identified from a given web site. The crawler typically does not return the document until a later stage, at which point the document is fetched. The results of a crawl can include documents that may or may not be useful. A typical crawler returns each file that it finds without regard to the contents of the file. An index that is created from the results of the crawl would then include each document identified by the crawler, and a search that is conducted from the index could contain one or more documents identified during the crawl. In addition and in a case that copies of the files/documents identified during the crawl are archived, documents identified during the crawl are saved. There is a significant impact and drain on resources, with significant impact on storage, bandwidth, processing, etc., to fetch, index, archive and search crawled resources, for example.

As a further illustration and from the user's standpoint, the impact can be felt by the user that conducts a search. A search typically involves a user who enters search criteria, which typically includes one or more search terms, and a server, or other computer system, which receives the search criteria and generates a set of results that are returned to the user for review. More particularly and in response to the request, the server uses the above-discussed index to identify the set of results to be returned to the user. In effect, the burden of reviewing the documents is placed on the user. Furthermore, the user must use the server's resources as well as network resources to retrieve the documents for review.

SUMMARY

The present disclosure seeks to address failings in the art and to determine a usefulness of a resource, e.g., a document, web page, etc., using an identifier, such as a universal resource locator, associated with the resource.

In accordance with one or more embodiments, a method, system and apparatus are provided to train a usefulness prediction model to generate a usefulness prediction in connection with a given universal resource locator (URL), the training of the usefulness prediction model being based on a training set of URLs and a count of negative URLs and a count of positive URLs identified by the training set, and for each feature extracted from the URLs in the training set, a count of the positive URLs in the training set that include the feature and a count of the negative URLs in the training set that include the feature. One or more features of the given URL are extracted, and the extracted features are used together with the usefulness prediction model to generate a usefulness prediction for the given URL.

In accordance with one or more embodiments, the usefulness prediction generated for a given URL is used to determine the usefulness of a resource associated with the given URL. In accordance with one or more embodiments, the usefulness prediction can be requested in connection with a crawling operation prior to retrieving a resource associated with the given URL, so that the usefulness prediction generated in connection with the given URL can be used to determine whether or not to retrieve the resource as part of the crawling operation. In accordance with one or more embodiments, the given URL can be a part of a set of search results, and the usefulness prediction requested in connection with the given URL can be used in determining whether or not to remove the given URL from the set of search results. In accordance with one or more embodiments, the given URL can be a part of a set of URLs and the usefulness prediction requested in connection with the given URL can be used to determine an order of the given URL in the set of URLs based on the usefulness prediction generated for the given URL and usefulness predictions generated for one or more other URLs in the set.

In accordance with one or more embodiments a usefulness prediction is generated using one or more features extracted from a given URL and a trained usefulness prediction model by generating a positive usefulness prediction value in connection with the given URL using the one or more features extracted from the given URL and the usefulness prediction model, generating a negative usefulness prediction value in connection with the given URL using the one or more features extracted from the given URL and the usefulness prediction model, and comparing the positive usefulness prediction value with the negative usefulness prediction value to generate the usefulness prediction in connection with the given URL. In accordance with one or more such embodiments, a resource associated with the given URL is identified as useful in a case that the positive usefulness prediction value is equal to or greater than the negative usefulness prediction value. In accordance with one or more such embodiments, a resource associated with the given URL is identified as not useful in a case that the positive usefulness prediction value is less than the negative usefulness prediction value.

In accordance with one or more embodiments a positive usefulness prediction value for a given URL is determined to be a ratio, or percentage, of a positive probability value as a numerator and a denominator which is the sum of the positive probability value and a negative probability value. The positive probability value comprises a product of a positive URL ratio and a positive ratio for each feature extracted from the given URL. The positive URL ratio is determined to be the number of positive URLs in the training set over the number of URLs in the training set. The positive ratio for each feature extracted from the given URL is determined to be the number of positive URLs in the training set which include the extracted feature divided by the number of positive URLs in the training set. The negative probability value comprises a product of a negative URL ratio and a negative ratio for each feature extracted from the given URL. The negative URL ratio is determined to be the number of negative URLs in the training set over the number of URLs in the training set. The negative ratio for each feature extracted from the given URL is determined to be the number of negative URLs in the training set which include the extracted feature divided by the number of negative URLs in the training set. A negative usefulness prediction value for a given URL is determined to be a ratio, or percentage, of the negative probability value as the numerator and a denominator which is the sum of the positive and negative probability values.

Alternatively, the positive usefulness prediction value can be determined using a product, P, of a feature vector that identifies the features extracted from the given URL and a weighting vector that includes a weighting for each of the features extracted from the given URL to generate the positive usefulness prediction value using a formula: $1/(1+e^{-P})$, and the negative usefulness prediction value can be determined using a product, P, of a feature vector that identifies the features extracted from the given URL and a weighting vector that includes a weighting for each of the features extracted from the given URL to generate the negative usefulness prediction value using a formula: $1-[1/(1+e^{-P})]$. In accordance with one more such embodiments, the weighting vector includes an intercept weighting that corresponds, at least initially, to the count of the positive URLs in the training set.

In accordance with one or more embodiments, the usefulness prediction model can comprise a decision tree, which is used to generate the usefulness prediction for a given URL. The nodes of the decision tree can be identified using negative and positive URLs counts and negative and positive feature counts identified using a training set.

DRAWINGS

The above-mentioned features and objects of the present disclosure will become more apparent with reference to the following description taken in conjunction with the accompanying drawings wherein like reference numerals denote like elements and in which:

FIG. 1 provides a component overview in accordance with one or more embodiments of the present disclosure.

Figure 2:
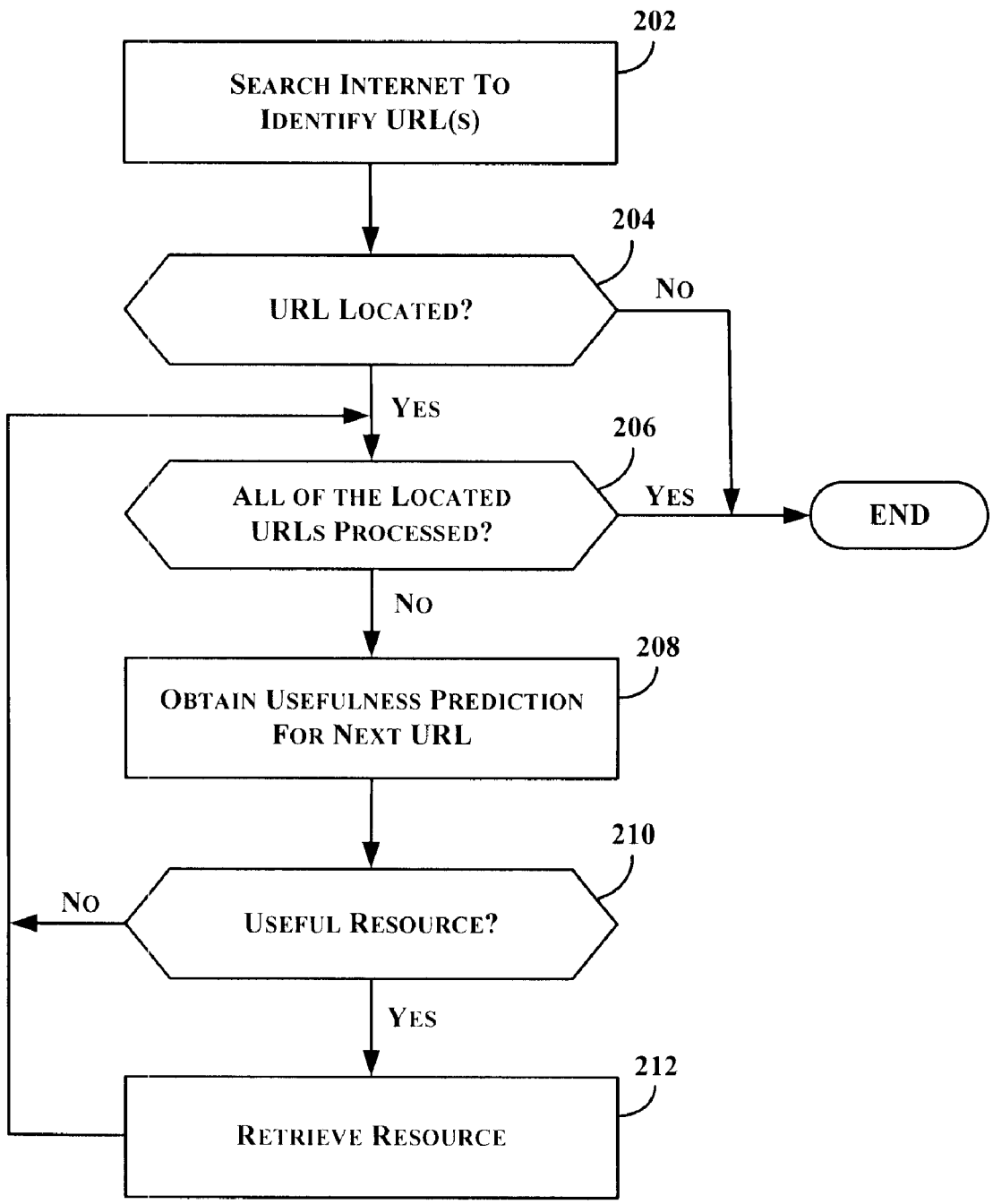

FIG. 2 provides an example of a crawl process flow for use in accordance with one or more embodiments of the present disclosure.

Figure 3:
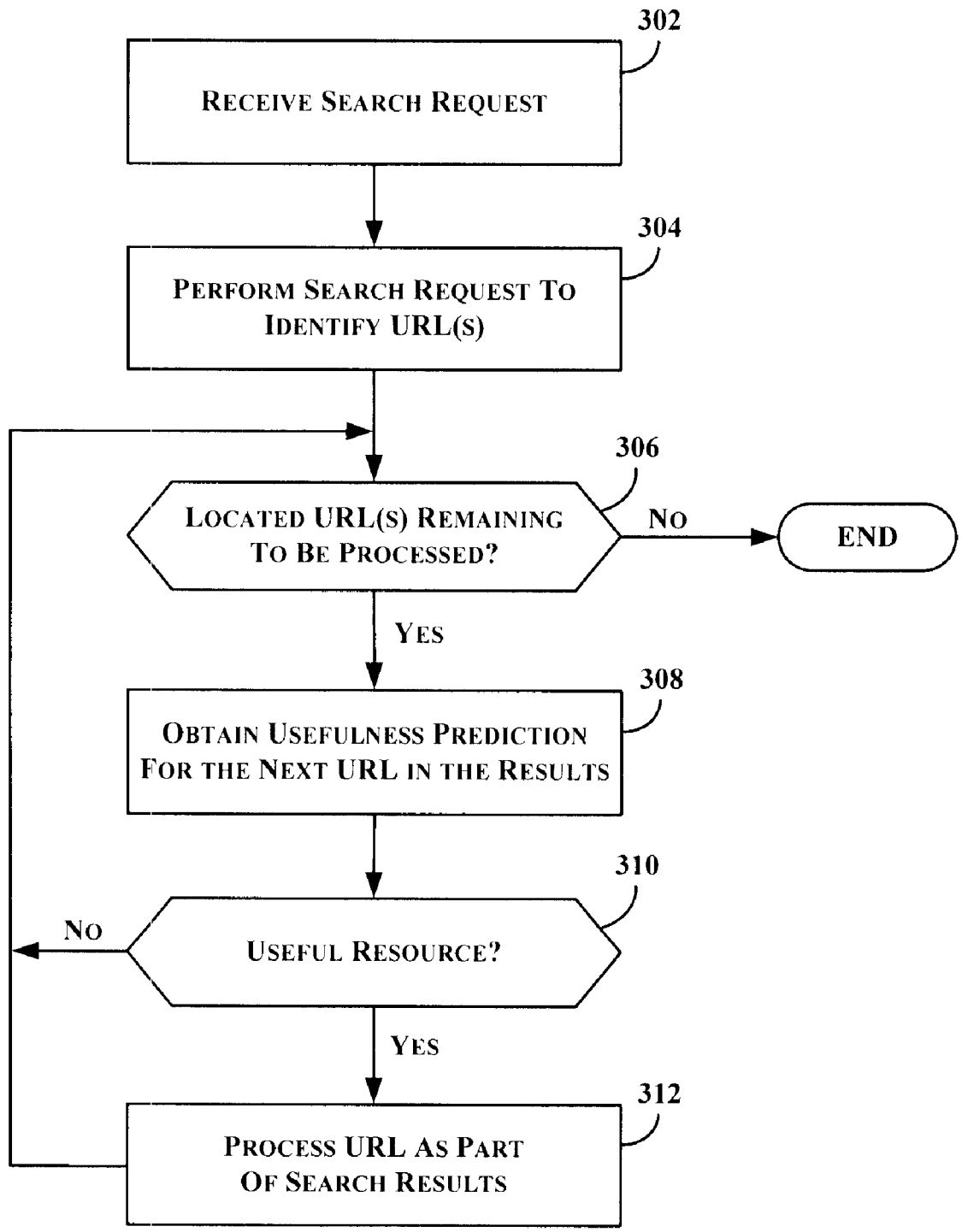

FIG. 3 provides a search process flow for use in accordance with one or more embodiments of the present disclosure.

Figure 4:
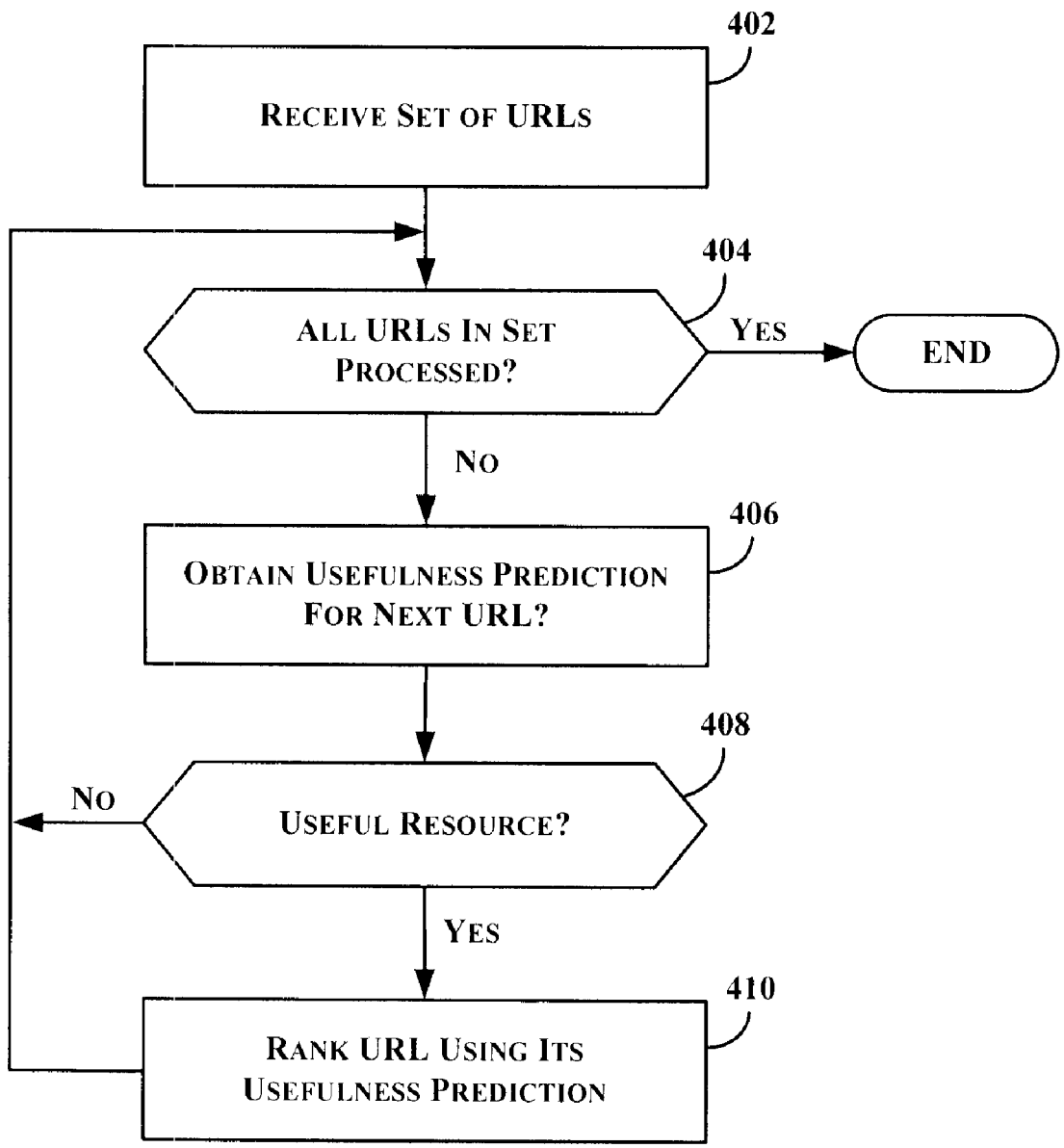

FIG. 4 provides a rank, or ordering, process flow for use in accordance with one or more embodiments of the present disclosure.

Figure 5:
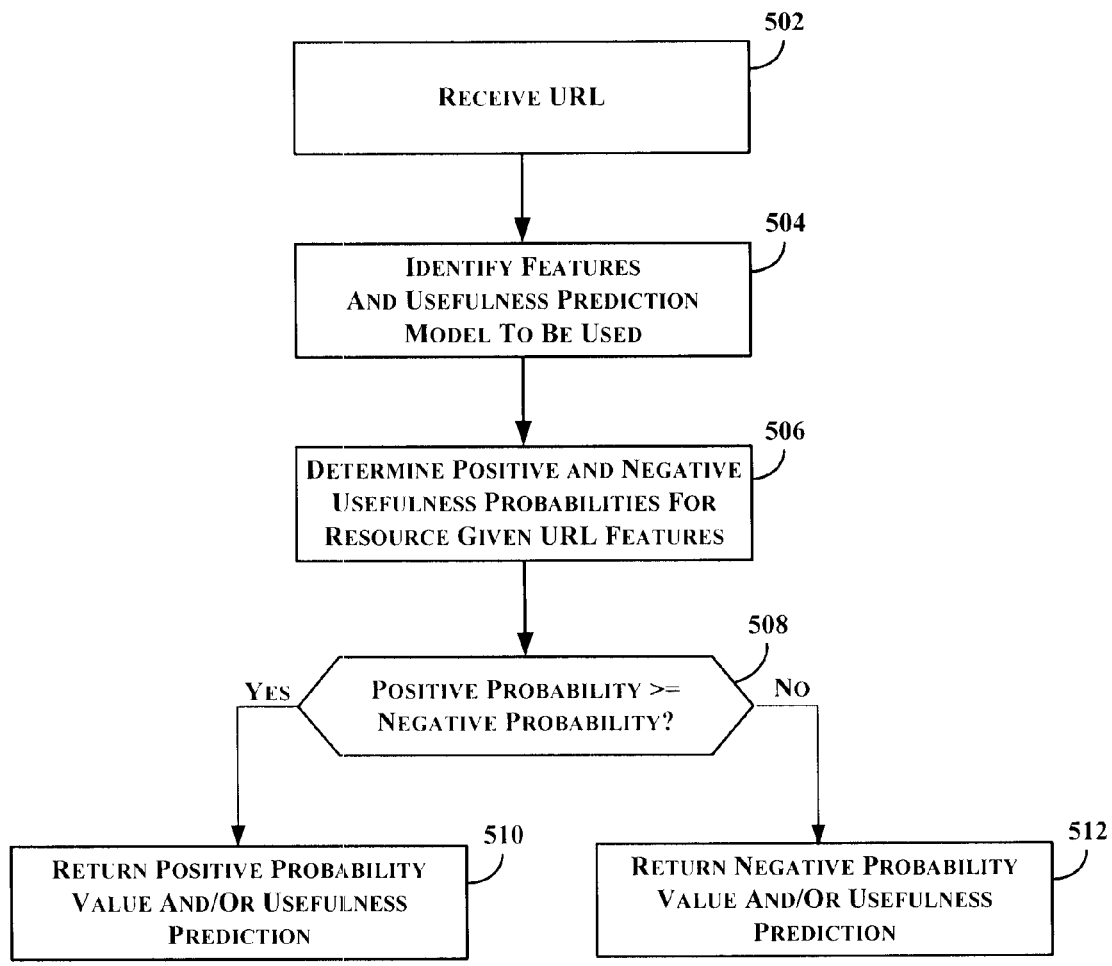

FIG. 5 provides a usefulness prediction process flow for use in accordance with one or more embodiments of the present disclosure.

Figure 6:
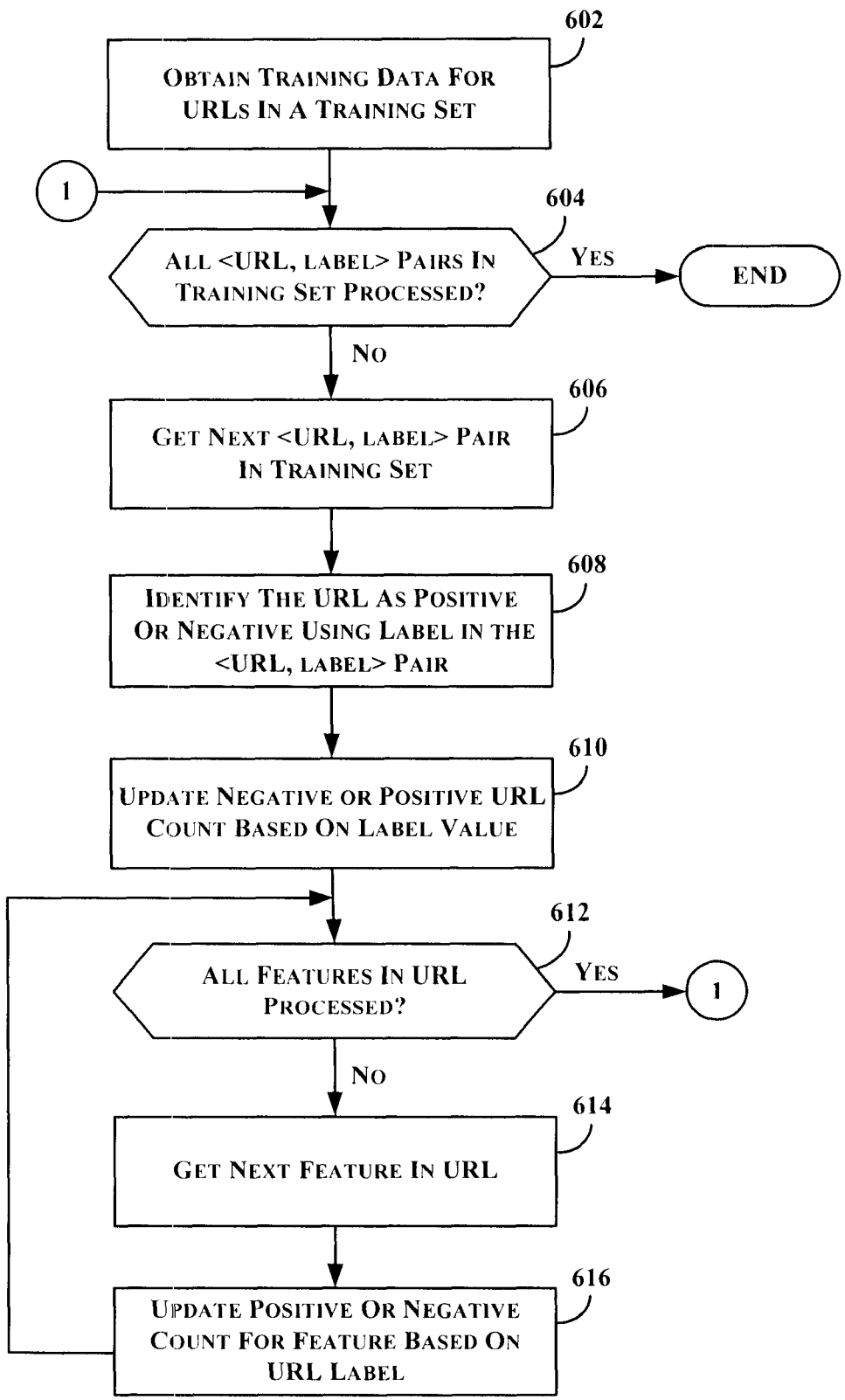

FIG. 6 provides an example of a model generation process flow used in accordance with one or more embodiments of the present disclosure.

FIG. 7 provides an example of model data used in accordance with one or more embodiments of the present disclosure.

FIG. 8, which comprises FIGS. 8A and 8B, provides an example of a usefulness prediction model that uses a Naïve Bayes statistical model in accordance with one or more embodiments of the present disclosure.

FIG. 9, which comprises FIGS. 9A and 9B, provides an example of a usefulness prediction model that uses logistic regression in accordance with one or more embodiments of the present disclosure.

Figure 10:
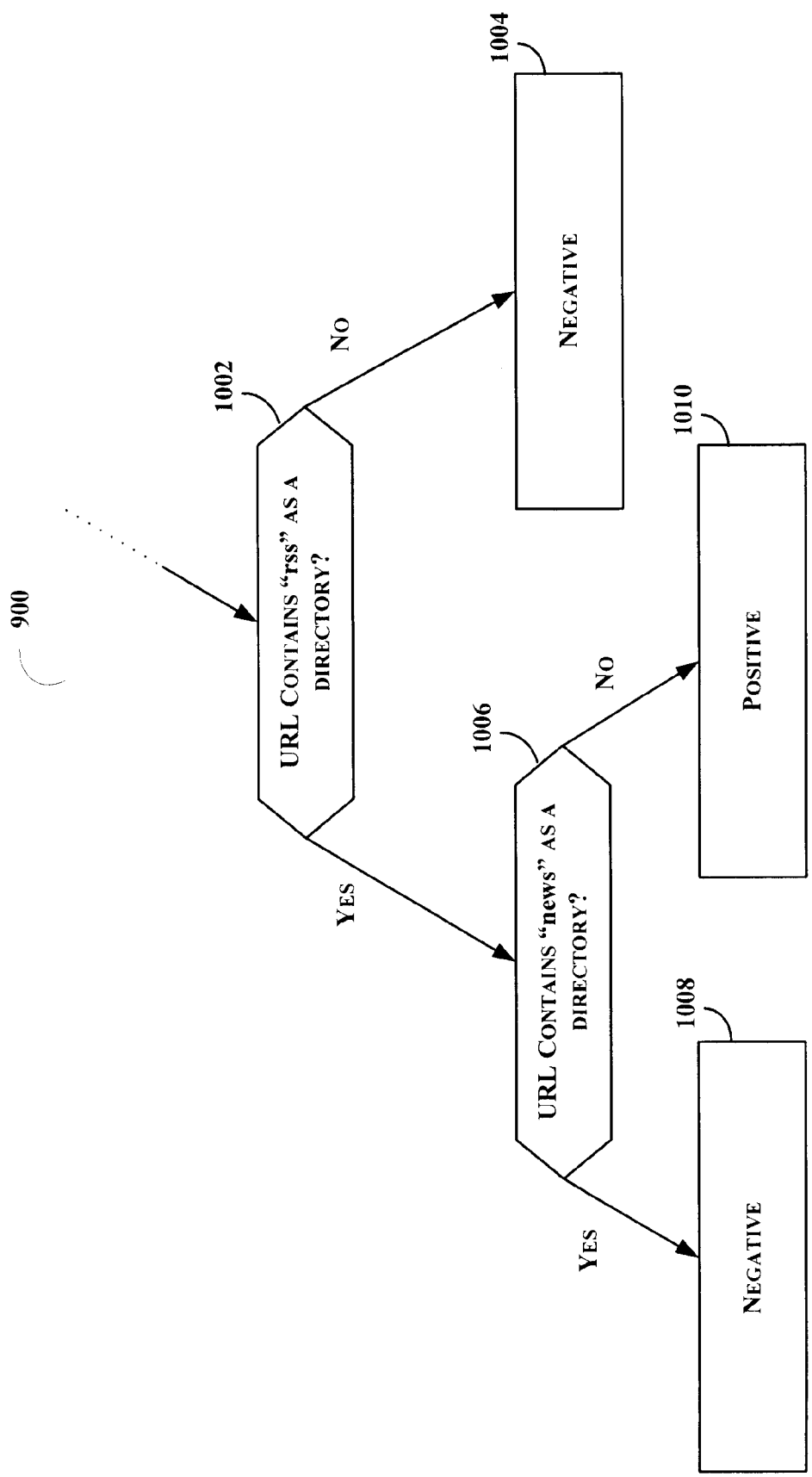

FIG. 10 provides an example of a decision tree for use in accordance with one or more embodiments of the present disclosure.

FIG. 11 provides an example for use in determining an information gain for a given feature in accordance with one or more embodiments of the present disclosure.

Figure 12:
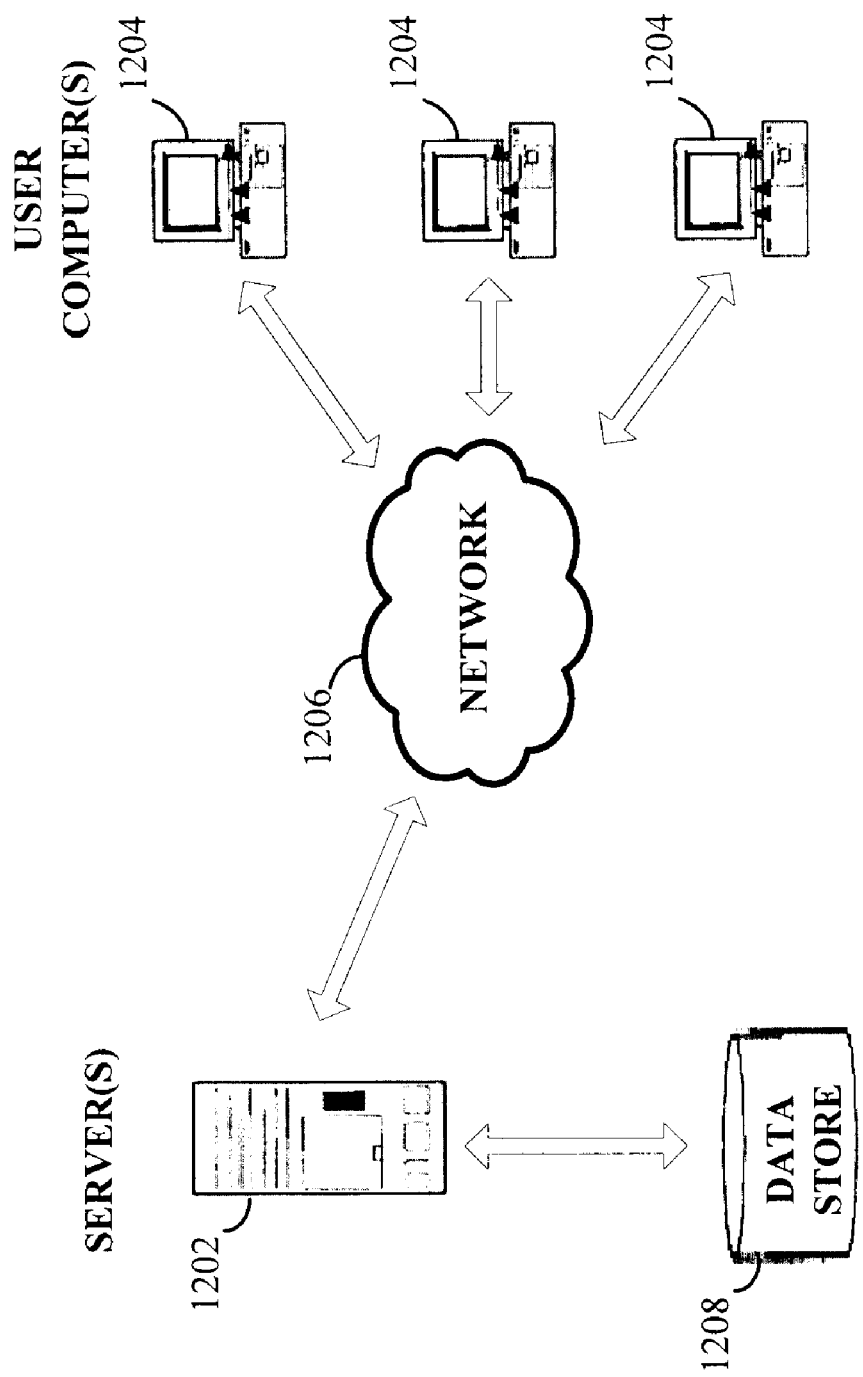

FIG. 12 illustrates some components that can be used in connection with one or more embodiments of the present disclosure.

DETAILED DESCRIPTION

In general, the present disclosure includes a resource usefulness prediction system, method and architecture.

Certain embodiments of the present disclosure will now be discussed with reference to the aforementioned figures, wherein like reference numerals refer to like components.

In accordance with one or more embodiments, data is extracted from identifiers, e.g., URLs, each of which identify a resource. The extracted data includes one or more features, which are used to determine a usefulness of a resource. A resource's usefulness can be its usefulness, or predicted usefulness, to one or more users, for example. A resource may be considered useful if it provides information that is useful to a user. By virtue of such embodiments, functions such as those performed by search engines, including crawling, indexing, ranking, and presentation, can use usefulness predictions as part of their operations, so as to optimize such operations. By way of a non-limiting example, a usefulness prediction associated with a URL can be used by a crawler to determine whether or not to crawl, e.g., retrieve, the resource identified by the URL. By way of a further non-limiting example, a usefulness prediction associated with a URL can be used to determine whether or not to return the URL as part of a set of search results provided in response to a user's search request, and/or can be used to rank the items in a set of search results.

Embodiments of the present disclosure use a collection of URLs, a learning set of URLs, to generate one or more usefulness prediction models. A usefulness prediction model is used in accordance with one or more such embodiments to predict, or estimate, a resource's usefulness, using features extracted from the resource's URL. A resource can be an item that is identified using a URL, or other resource identifier. Examples of resources include without limitation a web page, markup language (e.g., hypertext markup language (HTML), extensible markup language (XML), etc.) document, content (e.g., audio, video, streaming media, image, etc.) resource, etc. In accordance with one or more such embodiments, features extracted from a URL associated with a resource are provided as input to a usefulness predictor, which uses one or more usefulness prediction models to generate an estimation, or prediction, as to the usefulness of the associated resource. A usefulness prediction model can be a general model used for all URLs for which a prediction is to be generated, or a model selected for a given URL, e.g., based on the domain portion of the URL, for example.

FIG. 1 provides a component overview in accordance with one or more embodiments of the present disclosure. In the example shown in FIG. 1, a search engine 102 comprises one or more of a crawler, searcher and ranker, one or more of which uses a usefulness predictor 112 to optimize its operation. By way of a non-limiting example, the crawler can use the usefulness predictor 112 in determining whether or not to retrieve a resource, the searcher can use the usefulness predictor 112 to determine what items are to be included in a set items that comprise a search result to be returned to a user in response to a search request received from a user device 114, and the ranker can use the usefulness predictor 112 to determine an ordering, or ranking, of the items in a set of items, e.g., items in a search result.

Internet 100 is used by search engine 102 to crawl network stores 116 and as a mechanism to communicate with user device(s) 114, for example. It should be apparent that Internet 100 can be any network, including without limitation one or more of the World Wide Web, wide area network, local area network, etc.

Model generator 108 generates one or more usefulness prediction models, or usefulness models, 110 using a training set that identifies a set of URLs and a positive or negative indicator of usefulness. Examples of such URLs that can be identified as being positive or negative include URLs that have been clicked, or selected, by the user, URLs associated with a null or void resource (e.g., document, destination, etc.), URLs associated with content (e.g., video, audio, multimedia, streaming data, image, etc.).

User click log 106 includes one or more logs that identify URLs selected by users, e.g., users accessing items from search results provided by search engine 102 via user device 114 and the Internet 100. Click log 106 can identify a set of URLs previously selected by one or more users, e.g., web page URL, hyperlink in a web page, etc. Data store 104 stores resources retrieved by the crawler component of search engine 102. In addition, data store 104 can store one or more sets of training data. By way of a non-limiting example, training data can be in the form of <URL, label> pairs. By way of non-limiting examples, a label identifies a class of the URL. In a case that the classes include positive and negative classes, the label can have a positive or negative value, and can be used to label a URL as being positive or negative. A label can be assigned to a URL by search engine 102, for example. In addition to training data, data store 104 can comprise test or evaluation data used to test the usefulness prediction model(s) 110 generated by the model generator 108.

One or more of the usefulness prediction models 110 generated by the model generator 108 are used by usefulness predictor 112 to generate a usefulness prediction. A usefulness prediction generated by usefulness predictor 112 can be used by search engine 102 in one or more of its functions, e.g., crawling, searching, and ranking.

To further illustrate by way of a non-limiting example, a crawler component of the search engine 102 searches one or more network stores 116 to identify URLs associated with resources. The crawler component can request a usefulness prediction from predictor 112 for a URL identified by the crawler. As is described in more detail below, the predictor 112 uses at least one of the models 110 to identify a usefulness prediction for the URL. The crawler component can use the usefulness prediction provided by the predictor 112 to determine whether or not to retrieve the resource from the network store 116, for example.

FIG. 2 provides an example of a crawl process flow for use in accordance with one or more embodiments of the present disclosure. At step 202, the crawler uses the Internet 100, or other network, to search one or more network stores 116 to locate and identify URLs associated with available network resources, e.g., web pages, content, etc. At step 204, a determination is made whether or not any URLs are located from the search. If not, processing ends. If at least one URL is located from the search performed by the crawler at step 202, processing continues at step 206 to process the URLs located during the search. At step 206, a determination is made whether or not any of the URLs remain to be processed. If not, processing ends. If there are URLs that remain to be processed, processing continues at step 208 to obtain a usefulness prediction for the resource associated with the next URL identified in the search using the next URL. The usefulness prediction can be obtained from the usefulness predictor 112 by providing the usefulness predictor 112 with the URL, for example. A determination is made at step 210 whether or not the resource is useful based on the obtained usefulness prediction. If the usefulness prediction indicates that the resource is not useful, processing continues at step 206 to process any remaining URLs. If the usefulness prediction indicates that the resource is useful, processing continues at step 212 to retrieve the resource. In so doing, the usefulness prediction can be used to determined whether or not to retrieve a resource during a crawl performed by a crawler component of a search engine, e.g., search engine 102.

In the process flow described above, each resource is retrieved individually. In accordance with one or more embodiments, the process flow of FIG. 2 can be altered to collect a listing of the URLs for the resources that are determined to be useful, and to retrieve the resources at one time. More particularly, step 212 can be modified to add the resource's URL to a list of URLs rather than to retrieve the resource, and a step can be added after it is determined at step 206 that there are no URLs remaining to be processed. The added step would retrieve the resources based on the URLs contained in the list of URLs generated at modified step 212.

The results generated by the crawler can be made available for searching to one or more users of user devices 114. By way of another non-limiting example, a searching component of the search engine 102 can request a usefulness prediction for one or more of the URLs returned in a search conducted using criteria received from a user device 114. The usefulness prediction received for a given URL can be used to determine whether or not to include an item in the set of search results returned to the user device 114.

FIG. 3 provides a search process flow for use in accordance with one or more embodiments of the present disclosure. At step 302, a search request is received, e.g., by the search engine 102 from a user device 114. The search request includes a set of search criteria. At step 304 the search is performed using the search criteria received as part of the search request to identify a set of URLs, each of which is associated with a resource, that satisfy the user's search criteria. At step 306, a determination is made whether or not the search resulted in a set of URLs, and whether or not all of the URLs identified in the search have been processed. If so, processing ends. If there are some URLs that remain to be processed, processing continues at step 308 to obtain a usefulness prediction for the resource associated with the next URL identified in the search results.

At step 310, a determination is made whether or not the resource is useful based on the obtained usefulness prediction. If the usefulness prediction indicates that the resource is not useful, processing continues at step 306 to process any remaining URLs in the set of search results. If the usefulness prediction indicates that the resource is useful, processing continues at step 312 to process the URL as part of the search results.

In accordance with one or more embodiments, such processing includes a ranking or ordering of the search results prior to returning the search results are returned to the user. As yet another non-limiting example, a ranking component of the search engine 102 can be used to rank URLs. The ranking component, or ranker, can request usefulness predictions for one or more of the URLs in the set of search results. The usefulness predictions returned by the usefulness predictor 112 can be used to rank the items in the set of search results. The search results ranked using the usefulness prediction(s) returned by the usefulness predictor 112 can be returned to the user device 114.

FIG. 4 provides a rank, or ordering, process flow for use in accordance with one or more embodiments of the present disclosure. At step 402, a set of search results including URLs are received that are to be ranked, or ordered, based on a usefulness prediction associated with each URL in the set. By way of a non-limiting example, the set of URLs can include URLs generated in response to a received search request, e.g., a search request received by the search engine 102 from a user device 114. At step 404, a determination is made whether or not all of the received URLs have been processed if so, processing ends. If there are some URLs that remain to be processed, processing continues at step 406 to obtain a usefulness prediction for the resource associated with the next URL identified in the search result.

At step 408, a determination is made whether or not the resource is useful based on the obtained usefulness prediction. If the usefulness prediction indicates that the resource is not useful, processing continues at step 404 to process any remaining URLs in the set of received URLs. If the usefulness prediction indicates that the resource is useful, processing continues at step 410 to rank, or order, the URL with regard to the other URLs in the set of received URLs. As is described below and in accordance with one or more embodiments, a usefulness prediction can include a numeric value, which value can be used in comparison with usefulness prediction values associated with the other URLs to rank the URLs.

In the process flow example provided in FIG. 4, URLs that are not associated with a useful resource are not included in the ranking. As an alternative, such URLs can be included in the ordering. In a case that the ranking, or ordering, is from the most useful to the least useful, the URLs that are not associated with a useful resource can be positioned at the bottom of the rankings, with the more useful resources being located above. In accordance with one or more embodiments the search results identified at step 312, which can be ordered based on the ordering identified at step 410, can be returned to the user device 114.

In FIGS. 2 to 4, the process flow examples are performed separately. It should be apparent that any one or more of the process flows can be combined. For example, the user search process flow of FIG. 3 can be combined with the ranking process flow of FIG. 4. In such a case, a usefulness prediction for a given URL can be obtained once and used to determine whether or not to include the URL in a set of search results, as well as to identify its position in an ordered list of URLs to be returned in a set of search results.

In accordance with one or more embodiments, the search engine 102 can be configured to store a usefulness prediction, e.g., as part of an index of the URLs and/or resources, an index generated by the search engine 102. In such a case, the stored usefulness prediction can be retrieved and examined to avoid generating a usefulness prediction each time. Furthermore and in accordance with one or more embodiments, by performing the usefulness prediction at the crawler stage, an assumption can be made that the URLs identified in index are useful. Thus and in accordance with one or more such embodiments, the search component of search engine 102 need not perform steps 306 to 312 shown in FIG. 3, since the usefulness of the URL is performed by the crawler component of search engine 102. More particularly and in a case that the crawler component crawls only those resources that are determined to be useful based on the usefulness prediction generated from each resource's URL, the searching component of the search engine 102 can perform a search of the URLs/resources previously determined to be useful using the usefulness prediction generated by the usefulness predictor 112.

In accordance with one or more embodiments, usefulness predictor 112 receives one or more URLs and provides a usefulness prediction for each of the URLs received. FIG. 5 provides a usefulness prediction process flow for use in accordance with one or more embodiments of the present disclosure. At step 502, the usefulness predictor 112 receives a URL of a resource for which a usefulness prediction is to be made. At step 504, features of the URL are extracted and identified, and a usefulness prediction model 110 is selected. In accordance with one or more embodiments, there can be more than one usefulness prediction models 110. For example, there can be a usefulness prediction model 110 for different web sites. In such a case, the domain information extracted from the URL can be used to identify the usefulness prediction model 110 that corresponds with the domain indicated in the URL. In accordance with one or more embodiments, one usefulness prediction model 110 can be used for all of the URLs. It should be apparent that there can be any number of approaches used to select a usefulness prediction model 110, as well as any number of usefulness prediction models 110.

At step 506, positive and negative probabilities for use in determining a usefulness prediction are determined given the features of the URL. At step 508, a determination is made whether or not the positive probability value is greater than or equal to the negative probability value. In a case that the positive probability value is greater than or equal to the negative probability value, processing continues at step 510 to return a positive usefulness prediction, to indicate that the resource is useful. The usefulness prediction can be in the form of a true/false, or yes/no indication. In addition, or as an alternative, the positive probability value can be returned as the usefulness prediction. In yet another alternative, both the logical value and the numeric value can be returned by the usefulness predictor 112. In a case that the positive probability value is less than the negative probability value, processing continues at step 512 to return a negative prediction to indicate that the resource is not useful. As indicated above, the usefulness prediction can be in the form of a true/false, or yes/no indication, numeric value, or both.

In the example described with reference to FIG. 5, step 508 compares the positive and negative probability values to determine whether the positive value is equal to or exceeds the negative value. It should be apparent that other criteria can be used to make a determination as to the usefulness of a resource. For example, usefulness can be found in a case that the positive value is at least greater than the negative value. By way of another non-limiting example, one or more thresholds can be used other than the negative probability value, to which the positive value, the negative value, or both are compared to make a determination of usefulness.

In accordance with embodiments disclosed herein, one or more usefulness prediction models 110 can be used by the usefulness predictor 112 to determine a resource's usefulness. In accordance with one or more embodiments, usefulness prediction models 110 are generated by the model generator 108, which uses training data to generate the one or more usefulness prediction models 110. In accordance with one or more such embodiments, the training data comprises <URL, label> pairs. Features from each URL are extracted and associated with the URLs positive or negative label. In accordance with one or more embodiments, the <URL, label> pairs are input to the model generator 108. Alternatively, the model generator 108 can generate the <URL, label> pairs, e.g., using the click log 106 that identifies selected/clicked URLs, and information about the URLs stored in data store 104, e.g., what type of resource/data is associated with the URL. The model generator 108 uses the training data however obtained to generate at least one model.

FIG. 6 provides an example of a model generation process flow used in accordance with one or more embodiments of the present disclosure. In accordance with one or more embodiments, the model generation process flow is performed by the usefulness model generator 108. Briefly, the model generator 108 examines the <URL, label> pairs to identify the number of URLs that have positive labels and those that have negative pairs. In addition, the model generator 108 extracts features from the URLs, and identifies the number of times each extracted feature occurred in a <URL, positive> pair and the number of times the feature occurred in a <URL, negative> pair.

Referring to FIG. 6, at step 602, the model generator 108 obtains training data for URLs in a training set that is to be used to generate at least one usefulness model. At step 604, a determination is made whether or not all of the <URL, label> pairs in the training set have been processed. If so, processing ends. If not, processing continues at step 606 to get the next <URL, pair> in the training set. At step 608, the label is examined to determine whether the URL is a "positive URL" or a "negative URL." At step 610, a count of the number of negative URLs or a count of the number of positive URLs is updated based on the label value in the current <URL, label> pair.

At step 612, a determination is made whether or not all of the features of the URL have been processed. A feature is a segment, or portion, of the URL. By way of some non-limiting examples, a feature can comprise all or a portion of a host name, path, parameter, etc. segment of the URL. Examples of features include without limitation, "yahoo.com", "gallery", "news", "htm", "html", and "php". If there are no further features to be extracted from the URL in the current <URL, label> pair, processing continues at step 604 to process any remaining <URL, label> pairs. If features remain to be processing, processing continues at step 614 to get the next feature from the current URL. At step 616, if the label for the current <URL, label> pair has a positive value, a count associated with the current feature, which count identifies the number of positive URLs that contain the current feature, is incremented by one. If the label has a negative value, a count associated with the current feature, which count identifies the number of negative URLs that contain the current feature, is incremented by one. Processing continues at step 612 to process any remaining features of the URL in the <URL, label> pair.

As a result of the process flow described with reference to FIG. 6, there is a positive URL count that identifies the number of positive URLs in the training set, a negative URL count that identifies the number of negative URLs in the training set. In addition and for each feature extracted, there is a positive count that identifies the number of times the feature occurred in a positive URL, and a negative count that identifies the number of times the feature occurred in a negative URL. In accordance with one or more embodiments, the counts can be used in one more statistical determinations based on a statistical model used with the usefulness prediction model.

FIG. 7 provides an example of model data generated by the usefulness model generator 108 in accordance with one or more embodiments of the present disclosure. In the example shown in FIG. 7 and described with reference to FIG. 6, two classes, or values, of the label in the <URL, label> pair are used, e.g., positive and negative. It should be apparent, however, that any number of class types can be used with one or more embodiments of the present disclosure.

In accordance with one or more embodiments, URLs are categorized by classes, e.g., positive and negative classes. By way of some non-limiting examples, a URL that is clicked by the user is classified as a positive URL, a URL associated with an image is classified as positive and a URL associated with a null or void document is classified as a negative URL. Of course it should be apparent that any classification can be used, and any number of classes can be used. In accordance with one or more embodiments, criteria for assigning URLs to at least one of the classes can be based on its estimated probability of occurrence. By way of a non-limiting example, criteria that is likely to have the lowest probability of occurrence can be grouped into a class. By way of a further non-limiting example, the clicked, image and null and void pages can be grouped into a single class, e.g., a positive class, in a case that these indicators, or criteria, are likely to be used for a minority of URLs. As is discussed in more detail below, such a grouping can be used to evaluate the quality of a generated model.

FIG. 7 provides examples of the counts generated by the model generator 108 in a case that the training set uses positive, e.g., "Pos", and negative, e.g., "Neg", classes and comprises 1000 <URL, label> pairs, 100 of which have a positive label value and 900 of which have a negative label value. The URL counts, e.g., the number of URLs that have an associated positive label and the number of URLs that have an associated negative label, can be expressed in terms of probabilities 700A and 700B. In the example shown in FIG. 7, the features "news" and "html" were extracted from one or more URLs in the <URL, label> pairs included in the training set. In the case of the "news" feature, it occurred in 5 URLs that had a positive label value, and occurred in 1 URL with a negative label. The "html" feature occurred in 30 URLs with a positive label value and in 15 URLs with a negative label value. The feature counts can be expressed in terms of probabilities 702A, 702B, 704A and 704B.

In accordance with one or more embodiments, a usefulness prediction model 110 includes the URL and feature counts, and determines a positive usefulness prediction value to be a determined positive probability divided by the sum of a determined negative probability and the determined positive probability, and determines a negative usefulness prediction value to be the determined negative probability divided by the sum of the determined negative and positive probabilities. In accordance with one or more embodiments, the positive and negative prediction values are determined using a Naive Bayes statistical model.

FIG. 8, which comprises FIGS. 8A and 8B, provides an example of a usefulness prediction model that uses a Naïve Bayes statistical model to determine positive and negative probabilities in accordance with one or more embodiments of the present disclosure. In accordance with one or more such embodiments, both positive and negative usefulness prediction values are generated for a given URL, using the positive and negative probabilities that are determined from the URL and feature counts discussed above. A positive usefulness prediction value is generated, e.g., a ratio, or percentage, of a positive probability value as a numerator and a denominator which is the sum of the positive and negative probability values, as shown in expression 802A. A negative usefulness prediction value is generated, e.g., a ratio, or percentage, of the negative probability value as a numerator and a denominator which is the sum of the positive and negative probability values, as shown in expression 802B.

Expressions 802A and 802B use the positive and negative probability values generated using expressions 804A and 804B (respectively). Expression 804A generates the positive probability value, which is the result of multiplying a positive URL-level ratio and a positive feature-level ratio for each feature extracted from a URL. A positive URL, or URL-level, ratio is determined to be a ratio of the number of URLs classified as positive, or positive URLs, in the training set over the total number of URLs in the training set. By way of a non-limiting example, the positive URL, or URL-level, ratio in the example of FIG. 7 is P(Pos) 700A, which represents a ratio of the number of URLs classified as positive, or positive URLs, in the training set example over the total number of URLs in the training set example. A positive feature, or feature-level, ratio associated with an extracted feature is determined to be the number of positive URLs in the training set which include the feature divided by the number of positive URLs in the training set. By way of non-limiting examples, P("news"|Pos) 702A and P("html"|Pos) 704A are examples of positive feature ratios for the "news" and "html" features extracted from URLs in the example training set provided in FIG. 7. Expression 804B generates a negative probability value, which is the result of multiplying a negative URL, or URL-level, ratio and a negative feature, or feature-level, ratio for each feature extracted from a URL. A negative URL, or URL-level, ratio is determined to be a ratio of the number of URLs classified as negative, or negative URLs, in the training set over the total number of URLs in the training set. By way of a non-limiting example, the negative URL ratio in the example of FIG. 7 is P(Neg) 700B, which represents a ratio of the number of URLs classified as negative, or negative URLs, in the training set example over the total number of URLs in the training set example. A negative feature, or feature-level, ratio associated with an extracted feature is determined to be the number of negative URLs in the training set which include the feature divided by the number of negative URLs in the training set. By way of non-limiting examples, P("news"|Neg) 702B and P("html"|Neg) 704B are examples of negative feature ratios for the "news" and "html" features extracted from URLs in the example training set provided in FIG. 7.

For a given URL and features extracted from the URL, expression 802A determines a positive usefulness prediction value to be the positive probability divided by the sum of the positive and negative probabilities, and expression 802B determines a negative usefulness prediction value to be the negative probability divided by the sum of the positive and negative probabilities.

FIG. 8B provides an example of the positive and negative probabilities and positive and negative usefulness prediction values generated for a URL 810 and features 812 extracted from the URL 810 using the URL positive and negative counts 700A and 700B, respectively, the "news" positive and negative feature probabilities 702A and 702B, respectively, and the "html" positive and negative feature probabilities 704A and 704B, respectively.

Referring to expression 816A, the positive probability is determined by multiplying the positive URL probability, P(Pos) 700A, the "news" positive feature probability, P("news"|Pos) 702A, and the "html" positive feature probability, P("html"|Pos) 704A. Referring to expression 816B, the negative probability is determined by multiplying the negative URL probability, P(Neg) 700B, the "news" negative feature probability, P("news"|Neg) 702A, and the "html" negative feature probability, P("html"|Neg) 704A. Expressions 814A and 814B use the positive and negative probability values determined using expressions 816A and 816B. By expression 814A, the positive usefulness prediction value given the "news" and "html" features of URL 810 is determined by dividing the positive probability determined using the URL, "news" and "html" positive probability values by the sum of the positive and negative probabilities, with the negative probability being determined using the URL, "news" and "html" negative probability values. Stated another way, the positive usefulness prediction value is determined by dividing the result of expression 816A by the sum of the results of 816A and 816B. As shown in the expression 814B, the negative usefulness prediction value given the "news" and "html" features of URL 810 is determined by dividing the negative probability value determined using expression 816B by the sum of the positive and negative probabilities determined using expressions 816A and 816B, respectively.

In the case of the counts shown in FIG. 7, expressions 816A and 816B equal 0.0015 and 0.0000165, respectively. The numerator of expression 814A is the result of expression 816A, or 0.0015, and the denominator is the sum of the result of expression 816A, or 0.0015, and the result of 816B, or 0.0000165, which is 0.0015165. The result of dividing 0.0015 by 0.0000165 yields a positive usefulness prediction of 98.91%, as shown in expression 818A. Similarly, the result of dividing 0.0000165 by 0.0015165 yields a negative usefulness prediction of 1.09%, as shown in expression 816B. In the example shown in FIG. 8B, URL 810 has an associated positive usefulness prediction value that is greater than the associated negative usefulness prediction value. In a case that a resource is considered to be useful if the positive usefulness prediction value associated with its URL is greater than or equal to the negative usefulness prediction value associated with its URL, the resource associated with URL 810 is considered to be useful. As discussed herein, the positive usefulness prediction value, or negative usefulness prediction value, associated with the URL 810 can also be used to rank the URL 810 in a set of search results that includes the URL 810.

In the example of FIG. 8, the prediction model 110 used to generate the probabilities used to determine a usefulness prediction value uses a Naïve Bayes statistical model. It should be apparent that such determination can be made in a number of different ways, including various statistical models now known or later developed. By way of some non-limiting examples, a logistic regression statistical model and/or a decision tree can be used.

FIG. 9, which comprises FIGS. 9A and 9B, provides an example of a usefulness prediction model 110 that uses logistic regression in accordance with one or more embodiments of the present disclosure. The positive and negative usefulness prediction values, which are calculated using expressions 902A and 902B (respectively) of FIG. 9A, each use a product of two vectors, a feature vector and a weight vector. The feature vector includes a value for each feature identified from the training data. The value for a given feature identifies whether or not the feature exists in the URL for which a usefulness prediction is to be determined. In accordance with one embodiment, the value for a given feature is one in a case that the feature is present in the URL for which a usefulness prediction is to be determined, and is set to zero in a case that the feature is absent in the URL.

The weight vector includes a value for each feature identified from the training data. The weight for each feature can be empirically determined so as to identify an optimal weight for each item in the vector to minimize error in the predictions made using the model 110. By way of a non-limiting example, an initial weight associated with each feature can be based on the positive and/or negative counts of each feature.

In addition, the feature and weight vectors include an intercept value. The intercept value in the feature vector is equal to one, and the intercept value in the weight vector is equal to a weighting for the intercept value. An initial value for the intercept weight can be determined using the positive URL count, for example.

FIG. 9B provides an example feature and weight vectors that can be used in equations 902A and 902B. Row 904A identifies a position in each of the feature and weight vectors. Row 904B identifies examples of features identified from a set of training data, e.g., "html", "php", "news", etc. Row 904C identifies the values of the feature vector at the positions identified in row 904A for a given URL for which a usefulness prediction is to be generated by the model 110. In the example shown in row 904C, the URL for which a usefulness prediction value is to be calculated includes the "html" feature, but does not include the "php" and "news" features. Row 904D identifies weights for the intercept, as well as weights for the "html", "php" and "news" features. As shown in block 906, the product of the feature and weight vectors using the values identified in rows 904C and 904D yields a value of 0.4.

As is shown in expression 908A, the vector product result is used in the formula identified in expression 902A to yield a positive usefulness prediction value of 59.87%. Using the vector product result, expression 908B yields a negative usefulness prediction value of 40.13%, which is less than the positive usefulness prediction value.

In accordance with one or more embodiments, the weights included in the weight vector can be adjusted as part of an evaluation processed in order to minimize an error. For example, the results generated from expressions 908A and 908B can be compared to an actual usefulness value associated with the URL, as well as other URLs, to determine whether or not to adjust one or more of the weights in the weight vector. By way of a non-limiting example, each weight can be either increased or decreased by a small amount, e.g., less than or equal to 1%. New positive and negative usefulness predictions can then be determined and compared against the actual, or known, usefulness of the URL. This process can be repeated any number of times to optimize the weighting vector and minimize the error.

In accordance with one or more embodiments, a decision tree can be used to make a prediction regarding the usefulness of a resource based on features of the URL associated with the resource. FIG. 10 provides an example of a decision tree for use in accordance with one or more embodiments of the present disclosure. Decision tree 900 can be a subset of a decision tree. At node 1002, a decision is made whether or to proceed down the right or left path of decision tree 900 based on whether or not the URL for which a usefulness prediction is to be generated contains the "rss" feature, i.e., the URL identifies the "rss" directory. If not, the right path is taken, which results in node 1004 identifying a negative usefulness prediction for the URL. If it is determined that the URL does include the "rss" feature, the left path is taken to node 1006. At node 1006, a determination is made whether or not to pursue the left or right path based on whether or not the URL includes the "news" feature as part of a directory segment of the URL. If the URL does include the "news" feature, the left path is taken, which yields a negative usefulness prediction for the URL at node 1008. If the URL does not include the "news" feature, the right path is taken which yields a positive usefulness prediction for the URL at node 1010.

In accordance with one or more embodiments, at each level of the decision tree, the feature selected for that level is the feature that provides an optimal, e.g., largest, information gain. By way of a non-limiting example, an information gain can be determined to be the difference between a new information value and an old information value. In the example shown in FIG. 10, the "rss" feature could be selected for use as node 1002 over the "news" feature in a case that the information gain associated with using the "rss" feature at node 1002 is greater than the information gain associated with using the "news" feature at node 1002.

The information gain for a given feature can be determined based on the feature's presence and absence in negative and positive URLs in the training data. An information gain determined for one or more features identified in the training data can be used to select a feature for use at a given node. In accordance with one or more embodiments, a feature is selected for a given node that is likely to split the training URLs, as surrogates for the URLs for which a usefulness prediction is to be performed, in half based on the information gain determined for the feature and other features.

FIG. 11 provides an example for use in determining an information gain for a given feature in accordance with one or more embodiments of the present disclosure. The information gain is the difference between determined new information, or "New Info", and old information, or "Old Info", values. These values are calculated based on one or more of the number of positive URLs in the training set that include the feature, "A", the number of positive URLs in the training set that do not include the feature, "B", the number of negative URLs in the training data that include the feature, "C", and/or the number of negative URLs in the training data that do not include the feature, "D".

In the non-limiting example of FIG. 11, the new information value is the probability that a URL, either a positive or a negative URL, has the feature multiplied by a value, e.g., an "Info w/feature" value, plus the probability that a URL, either a positive or negative URL, does not have the feature times a value, e.g., an "Info w/o feature" value. The information with feature, or Info w/Feature, and the information without feature, or Info w/o Feature, values are determined as shown in FIG. 11 using one or more of the values associated with the A, B, C and D variables. The old information gain value is determined based on a probabilities determined using one or more of the A, B, C and D variables.

The information gain, e.g., as determined in accordance with the example of FIG. 11, for each feature can be used to select a feature that has the largest information gain in comparison to the features remaining to be selected for nodes in the decision tree. Once a feature is selected for a given node, another feature can be selected from the remaining features based on the information gain associated with each of the remaining features.

In accordance with one or more embodiments, model generation is a form of machine learning, which uses a training set of URLs to generate the models 110. Embodiments of the present invention contemplate use of one or more techniques to evaluate the quality of a generated model. In one or more embodiments, one or more metrics, e.g., precision and recall, can be used to evaluate quality. Classification, either positive or negative, of the URLs in the training set can be based on some degree on whether the criteria used to classify the URLs applies to a minority or a majority of the URLs. By way of some non-limiting examples, a URL that is clicked by the user is classified as a positive URL, a URL associated with an image is classified as positive and a URL associated with a null or void document is classified as a positive URL, not a negative URL. This classification can be used so that the URLs classified as positive are likely to be in a minority as compared to the other URLs in the training set. In so doing, it is possible to limit predictions to a minority of cases, and/or to achieve a desired quality level.

Examples of metrics that can be used to evaluate the quality of the model include without limitation recall and precision, which metrics can be more sensitive to the quality of a model by concentrating a minority of the examples to a given class, e.g., the positive class. In a case that one other class is used, e.g., a negative class, the remaining URLs that are not part of the minority can be classified as negative. One or more of false positive, true positive, false negative and true negative values can be used to determine the recall and precision metrics. True positive identifies the number of URLs in an evaluation set that are correctly predicted to be positive by the model, e.g., the model generated a positive usefulness prediction and the URL/resource has an actual usefulness. True negative identifies the number of URLs in the evaluation set that are correctly predicted to be negative by the model, e.g., the model generated a negative usefulness prediction and the URL/resource is actually not useful. False positive identifies the number of the URLs in an evaluation set that are incorrectly predicted to be positive by the model, e.g., the model generated a positive usefulness prediction and the URL/resource is actually not useful. False negative identifies the number of URLs in the evaluation set that are incorrectly predicted to be negative by the model, e.g., the model generated a negative usefulness prediction and the URL/resource is actually useful.

By way of a non-limiting example, recall can be determined as:

True positive/(True positive+False Negative)

By way of a further non-limiting example, precision can be determined as:

True positive/(True positive+False Positive)

In accordance with one or more embodiments, a model generated by the usefulness model generator 108 can be evaluated using a set of test, or evaluation, data in the form of <URL, label> pairs. The label identifies whether or not the URL/resource is actually useful. An evaluation URL is submitted to the usefulness predictor 112, which generates a usefulness prediction using the usefulness prediction model 110 that is being tested. The usefulness prediction output by the usefulness predictor 112 is compared with the URL's label from the evaluation data set to determine whether the predicted usefulness agrees with the actual usefulness, either a true positive or a true negative reading depending on whether the prediction is positive or negative, or whether the predicted usefulness disagrees with the actual usefulness, either a false positive or a false negative. Recall and precision metrics can be determined as part of the evaluation performed for a given usefulness prediction model 110. The results of the evaluation can be used to determine whether or not to adjust a model 110, and/or to generate a new model 110, for example.

FIG. 12 illustrates some components that can be used in connection with one or more embodiments of the present disclosure. In accordance with one or more embodiments of the present disclosure, one or more computing devices, e.g., one or more servers, user devices 114 or other computing device, 1202 are configured to comprise functionality described herein. For example, a computing device 1202 can be configured as usefulness model generator 108, which uses URLs in a machine learning phase, to generate one or more usefulness prediction models 110 in accordance with one or more embodiments of the present disclosure. The same or another computing device 1202 can be configured as search engine 102, which can comprise one more of a crawler, searching and ranker of URLs and associated resources, usefulness predictor 112, which supplies a usefulness prediction for a given URL based on the URL's features and a usefulness prediction model in accordance with one or more embodiments. The same or another computing device 1202 can be associated with one or more resource data store 104. It should be apparent that one or more of the search engine 102, usefulness model generator 108 and usefulness predictor 112 can be the same computing device 1202, or can be a different computing device 1202.

Computing device 1202 can serve content to user computers 1204 using a browser application via a network 1206. Data store 1208, which can include data store 104, can be used to store training and/or evaluation data sets, click logs, resources associated with URLs, usefulness models, program code to configure a server 1202 to execute the search engine 102, usefulness model generator 108 and/or usefulness predictor 112, configuration information, etc.

The user computer 1204, and/or user device 114, can be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 1202 and the user computer 1204 can include one or more processors, memory, a removable media reader, network interface, display and interface, and one or more input devices, e.g., keyboard, keypad, mouse, etc. and input device interface, for example. One skilled in the art will recognize that server 1202 and user computer 1204 may be configured in many different ways and implemented using many different combinations of hardware, software, or firmware.

In accordance with one or more embodiments, a computing device 1202 makes a user interface available to a user computer 1204 via the network 1206. The user interface made available to the user computer 1204 can include content items, or identifiers (e.g., URLs) selected for the user interface based on usefulness prediction(s) generated in accordance with one or more embodiments of the present invention. In accordance with one or more embodiments, computing device 1202 makes a user interface available to a user computer 1204 by communicating a definition of the user interface to the user computer 1204 via the network 1206. The user interface definition can be specified using any of a number of languages, including without limitation a markup language such as Hypertext Markup Language, scripts, applets and the like. The user interface definition can be processed by an application executing on the user computer 1204, such as a browser application, to output the user interface on a display coupled, e.g., a display directly or indirectly connected, to the user computer 1204.

In an embodiment the network 1206 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

It should be apparent that embodiments of the present disclosure can be implemented in a client-server environment such as that shown in FIG. 12. Alternatively, embodiments of the present disclosure can be implemented other environments, e.g., a peer-to-peer environment as one non-limiting example.

For the purposes of this disclosure a computer readable medium stores computer data, which data can include computer program code executable by a computer, in machine readable form. By way of example, and not limitation, a computer readable medium may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

In accordance with one or more embodiments, a user interface with which content items is made available to a user, e.g., the user's computing device, via a network such as the Internet or other network, and content items are made available via the user interface based on win shares associated with one or more of the content items. By way of a non-limiting example, a content item's win share can be used to determine whether or not to make the content item available, the frequency with which the content item is made available, and/or a display order for the content items in the user interface.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of what are presently considered to be the most practical and preferred embodiments, it is to be understood that the disclosure need not be limited to the disclosed embodiments. It is intended to cover various modifications and similar arrangement included within the spirit and scope of the claims, the scope of which should be accorded the broadest interpretation so as to encompass all such modifications and similar structures. The present disclosure includes any and all embodiments of the following claims.

The invention claimed is:

1. A computer-implemented method comprising:
    training a usefulness prediction model to generate a usefulness prediction in connection with a given universal resource locator (URL),
    the training of the usefulness prediction model comprising:
    inputting a training set of URLs,
    determining the quantity of negative URLs and positive URLs identified by the training set,
    extracting one or more features from the URLs in the training set,
    counting the number of times each feature occurs in said positive URLs,
    counting the number of times each feature occurs in said negative URLs, and
    using the quantities of positive and negative URLs, the number of times the features occurred in said positive and negative URLs, the one or more features extracted from the given URL and the usefulness prediction model to generate the usefulness prediction in connection with the given URL.

2. The method of claim 1, further comprising:
    determining a usefulness of a resource associated with the given URL based on the usefulness prediction for the given URL.

3. The method of claim 1, using the one or more features extracted from the given URL and the usefulness prediction model to generate the usefulness prediction in connection with the given URL further comprising:
    generating a positive usefulness prediction value in connection with the given URL using the one or more features extracted from the given URL and the usefulness prediction model;
    generating a negative usefulness prediction value in connection with the given URL using the one or more features extracted from the given URL and the usefulness prediction model; and
    comparing the positive usefulness prediction value with the negative usefulness prediction value to generate the usefulness prediction in connection with the given URL.

4. The method of claim 3, further comprising:
    identifying a resource associated with the given URL as useful in a case that the positive usefulness prediction value is equal to or greater than the negative usefulness prediction value.

5. The method of claim 3, further comprising:
    identifying a resource associated with the given URL as not useful in a case that the positive usefulness prediction value is less than the negative usefulness prediction value.

6. The method of claim 3, the generating a positive usefulness prediction value further comprising:
    determining the positive usefulness prediction value to be a ratio of a positive probability to a sum of the positive probability and a negative probability, the positive probability being a product of a positive URL probability and a positive feature probability for each feature extracted from the given URL, the negative probability being a product of a negative URL probability and a negative feature probability for each feature extracted from the given URL, the positive URL probability being a ratio of a number of URLs classified as positive in the training set to a total number of URLs in the training set, the negative URL probability being a ratio of a number of URLs classified as negative in the training set to the total number of URLs in the training set, the positive feature probability for each feature being a ratio of a number of URLs in the training set that are classified as positive that include the feature to the number of URLs classified as positive in the training set, and the negative feature probability for each feature being a number of URLs in the training set that are classified as negative that include the feature to the number of URLs classified as negative in the training set.

7. The method of claim 3, the generating a negative usefulness prediction value further comprising:
determining the negative usefulness prediction value to be a ratio of a negative probability to a sum of the negative probability and a positive probability, the positive probability being a product of a positive URL probability and a positive feature probability for each feature extracted from the given URL, the negative probability being a product of a negative URL probability and a negative feature probability for each feature extracted from the given URL, the positive URL probability being a ratio of a number of URLs classified as positive in the training set to a total number of URLs in the training set, the negative URL probability being a ratio of a number of URLs classified as negative in the training set to the total number of URLs in the training set, the positive feature probability for each feature being a ratio of a number of URLs in the training set that are classified as positive that include the feature to the number of URLs classified as positive in the training set, and the negative feature probability for each feature being a number of URLs in the training set that are classified as negative that include the feature to the number of URLs classified as negative in the training set.

8. The method of claim 3, the generating a positive usefulness prediction value further comprising:
determining the positive usefulness prediction value using a product, P, of a feature vector that identifies the features extracted from the given URL and a weighting vector that includes a weighting for each of the features extracted from the given URL to generate the positive usefulness prediction value using a formula:

$1/(1+e^{-P})$.

9. The method of claim 8, the weighting vector including an intercept weighting that corresponds to the count of the positive URLs in the training set.

10. The method of claim 3, the generating a negative usefulness prediction value further comprising:
determining the negative usefulness prediction value using a product, P, of a feature vector that identifies the features extracted from the given URL and a weighting vector that includes a weighting for each of the features extracted from the given URL to generate the negative usefulness prediction value using a formula:

$1-[1/(1+e^{-P})]$.

11. The method of claim 10, the weighting vector including an intercept weighting that corresponds to the count of the positive URLs in the training set.

12. The method of claim 1, further comprising:
requesting the usefulness prediction in connection with a crawling operation prior to retrieving a resource associated with the given URL; and
determining whether or not to retrieve the resource associated with the given URL using the usefulness prediction generated in connection with the given URL.

13. The method of claim 1, the given URL being a part of a set of search results, the method further comprising:
requesting the usefulness prediction in connection with the given URL;
determining whether or not to remove the given URL from the set of search results using the usefulness prediction generated in connection with the given URL.

14. The method of claim 1, the given URL being a part of a set of URLs, the method further comprising:
requesting the usefulness prediction in connection with the given URL;
determining an order of the given URL in the set of URLs based on the usefulness prediction generated in connection with the given URL and usefulness predictions generated in connection with one or more other URLs in the set.

15. The method of claim 1, using the one or more features extracted from the given URL and the usefulness prediction model to generate the usefulness prediction in connection with the given URL further comprising:
using a decision tree to generate the usefulness prediction in connection with the given URL, the nodes of the decision tree being identified using the negative and positive URLs count and the negative and positive feature counts identified by the training set.

16. A non-transitory computer-readable medium storing computer-executable program code comprising code to configure at least one processor to:
train a usefulness prediction model to generate a usefulness prediction in connection with a given universal resource locator (URL),
the training of the usefulness prediction model comprising:
inputting a training set of URLs,
determining the quantity of negative URLs and positive URLs identified by the training set,
extracting one or more features from the URLs in the training set,
counting the number of times each feature occurs in said positive URLs,
counting the number of times each feature occurs in said negative URLs, and
using the quantities of positive and negative URLs, the number of times the features occurred in said positive and negative URLs, the one or more features extracted from the given URL and the usefulness prediction model to generate the usefulness prediction in connection with the given URL.

17. The computer-readable medium of claim 16, further comprising program code to configure the at least one processor to:
determine a usefulness of a resource associated with the given URL based on the usefulness prediction for the given URL.

18. The computer-readable medium of claim 16, the program code to configure the one or more processors to use the one or more features extracted from the given URL and the usefulness prediction model to generate the usefulness prediction in connection with the given URL further comprising program code to cause the one or more processors to:
generate a positive usefulness prediction value in connection with the given URL using the one or more features extracted from the given URL and the usefulness prediction model;

generate a negative usefulness prediction value in connection with the given URL using the one or more features extracted from the given URL and the usefulness prediction model; and compare the positive usefulness prediction value with the negative usefulness prediction value to generate the usefulness prediction in connection with the given URL.

19. The computer-readable medium of claim 18, further comprising program code to configure the one or more processors to:

identify a resource associated with the given URL as useful in a case that the positive usefulness prediction value is equal to or greater than the negative usefulness prediction value.

20. The computer-readable medium of claim 18, further comprising program code to configure the one or more processors to:

identify a resource associated with the given URL as not useful in a case that the positive usefulness prediction value is less than the negative usefulness prediction value.

21. The computer readable medium of claim 18, the program code to configure the one or more processors to generate a positive usefulness prediction value further comprising program code to configure the one or more processors to:

determine the positive usefulness prediction value to be a ratio of a positive probability to a sum of the positive probability and a negative probability, the positive probability being a product of a positive URL probability and a positive feature probability for each feature extracted from the given URL, the negative probability being a product of a negative URL probability and a negative feature probability for each feature extracted from the given URL, the positive URL probability being a ratio of a number of URLs classified as positive in the training set to a total number of URLs in the training set, the negative URL probability being a ratio of a number of URLs classified as negative in the training set to the total number of URLs in the training set, the positive feature probability for each feature being a ratio of a number of URLs in the training set that are classified as positive that include the feature to the number of URLs classified as positive in the training set, and the negative feature probability for each feature being a number of URLs in the training set that are classified as negative that include the feature to the number of URLs classified as negative in the training set.

22. The computer-readable medium of claim 18, the program code to configure the one or more processors to generate a negative usefulness prediction value further comprising program code to configure the one or more processors to:

determine the negative usefulness prediction value to be a ratio of a negative probability to a sum of the negative probability and a positive probability, the positive probability being a product of a positive URL probability and a positive feature probability for each feature extracted from the given URL, the negative probability being a product of a negative URL probability and a negative feature probability for each feature extracted from the given URL, the positive URL probability being a ratio of a number of URLs classified as positive in the training set to a total number of URLs in the training set, the negative URL probability being a ratio of a number of URLs classified as negative in the training set to the total number of URLs in the training set, the positive feature probability for each feature being a ratio of a number of URLs in the training set that are classified as positive that include the feature to the number of URLs classified as positive in the training set, and the negative feature probability for each feature being a number of URLs in the training set that are classified as negative that include the feature to the number of URLs classified as negative in the training set.

23. The computer-readable medium of claim 18, the program code to configure one or more processors to generate a positive usefulness prediction value further comprising program code to configure the one or more processors to:

determine the positive usefulness prediction value using a product, P, of a feature vector that identifies the features extracted from the given URL and a weighting vector that includes a weighting for each of the features extracted from the given URL to generate the positive usefulness prediction value using a formula: $1/(1+e^{-P})$.

24. The computer-readable medium of claim 23, the weighting vector including an intercept weighting that corresponds to the count of the positive URLs in the training set.

25. The computer-readable medium of claim 18, the program code to configure the one or more processor to generate a negative usefulness prediction value further comprising program code to configure the one or more processors to:

determine the negative usefulness prediction value using a product, P, of a feature vector that identifies the features extracted from the given URL and a weighting vector that includes a weighting for each of the features extracted from the given URL to generate the negative usefulness prediction value using a formula: $1'1[1/(1+e^{-P})]$.

26. The computer-readable medium of claim 25, the weighting vector including an intercept weighting that corresponds to the count of the positive URLs in the training set.

27. The computer-readable medium of claim 16, further comprising computer code to configure the one or more processors to:

request the usefulness prediction in connection with a crawling operation prior to retrieving a resource associated with the given URL; and determine whether or not to retrieve the resource associated with the given URL using the usefulness prediction generated in connection with the given URL.

28. The computer-readable medium of claim 16, the given URL being a part of a set of search results, the program code further comprising program code to configure the one or more processors to:

request the usefulness prediction in connection with the given URL;

determine whether or not to remove the given URL from the set of search results using the usefulness prediction generated in connection with the given URL.

29. The computer-readable of claim 16, the given URL being a part of a set of URLs, the program code further comprising program code to configure the one or more processors to:

request the usefulness prediction in connection with the given URL;

determine an order of the given URL in the set of URLs based on the usefulness prediction generated in connection with the given URL and usefulness predictions generated in connection with one or more other URLs in the set.

30. The computer-readable medium of claim 16, the program code to configure the one or more processors to use the one or more features extracted from the given URL and the usefulness prediction model to generate the usefulness prediction in connection with the given URL further comprising program code to configure the one or more processors to:
   use a decision tree to generate the usefulness prediction in connection with the given URL, the nodes of the decision tree being identified using the negative and positive URLs count and the negative and positive feature counts identified by the training set.

31. A computer-implemented system comprising:
   a search engine configured to use a usefulness prediction generated from a given universal resource locator (URL) as a part of an operation performed by the search engine involving the given URL;
   a usefulness predictor that generates the usefulness prediction from the given URL using a usefulness model by:
   determining a quantity of negative URLs and positive URLs identified by a training set;
   obtaining a positive usefulness prediction probability value in connection with the given URL using a count of one or more features extracted from the given URL and the usefulness prediction model;
   obtaining a negative usefulness prediction probability value in connection with the given URL using a count of one or more features extracted from the given URL and the usefulness prediction model; and
   comparing the positive usefulness prediction probability value with the negative usefulness prediction probability value to generate the usefulness prediction in connection with the given URL.

32. The system of claim 31, said search engine further comprising a crawler component, said crawler component configured to:
   request the usefulness prediction in connection with a crawling operation prior to retrieving a resource associated with the given URL; and
   determine whether or not to retrieve the resource associated with the given URL using the usefulness prediction requested in connection with the given URL.

33. The system of claim 31, said search engine further comprising a search component and the given URL is a part of a set of search results generated by the search component, the search component configured to:
   request the usefulness prediction in connection with the given URL;
   determine whether or not to remove the given URL from the set of search results using the usefulness prediction requested in connection with the given URL.

34. The system of claim 31, said search engine further comprising a ranking component and the given URL is a part of a set of URLs to be ranked, the ranking component configured to:
   request the usefulness prediction in connection with the given URL;
   determine an order of the given URL in the set of URLs based on the usefulness prediction generated in connection with the given URL and usefulness predictions requested in connection with one more other URLs in the set.

* * * * *